Nov. 7, 1933.　　　　　J. BRABAEK　　　　　1,933,960
APPARATUS FOR THE REMOVAL OF VAPORIZABLE CONSTITUENTS
FROM LIQUID OR PASTY OR SOLID MATTERS
Original Filed Nov. 2, 1929　　2 Sheets-Sheet 2
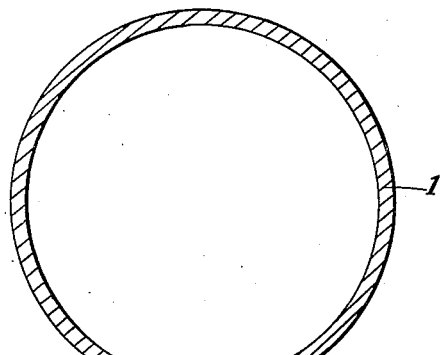
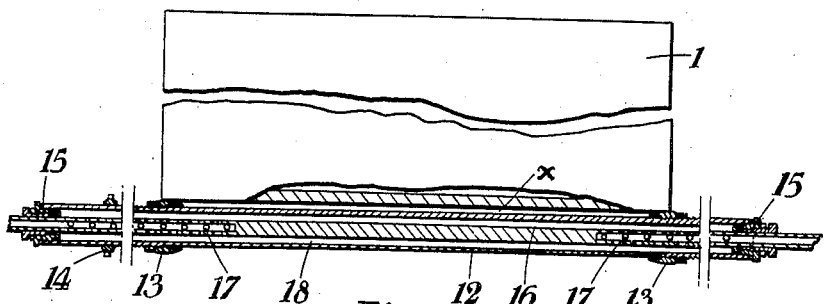
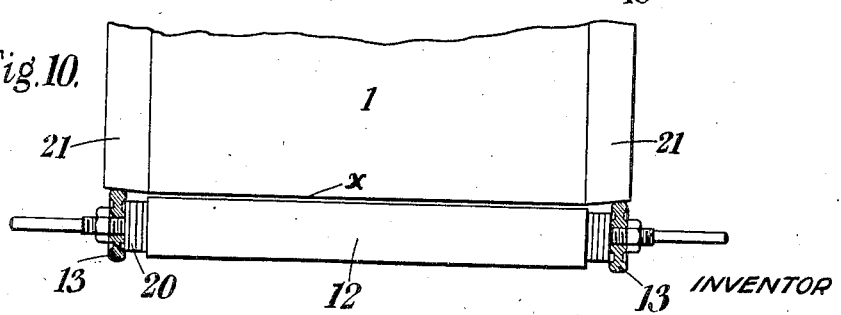
INVENTOR
Jorgen Brabaek
BY
Langner, Parry, Card & Langner
ATTORNEYS

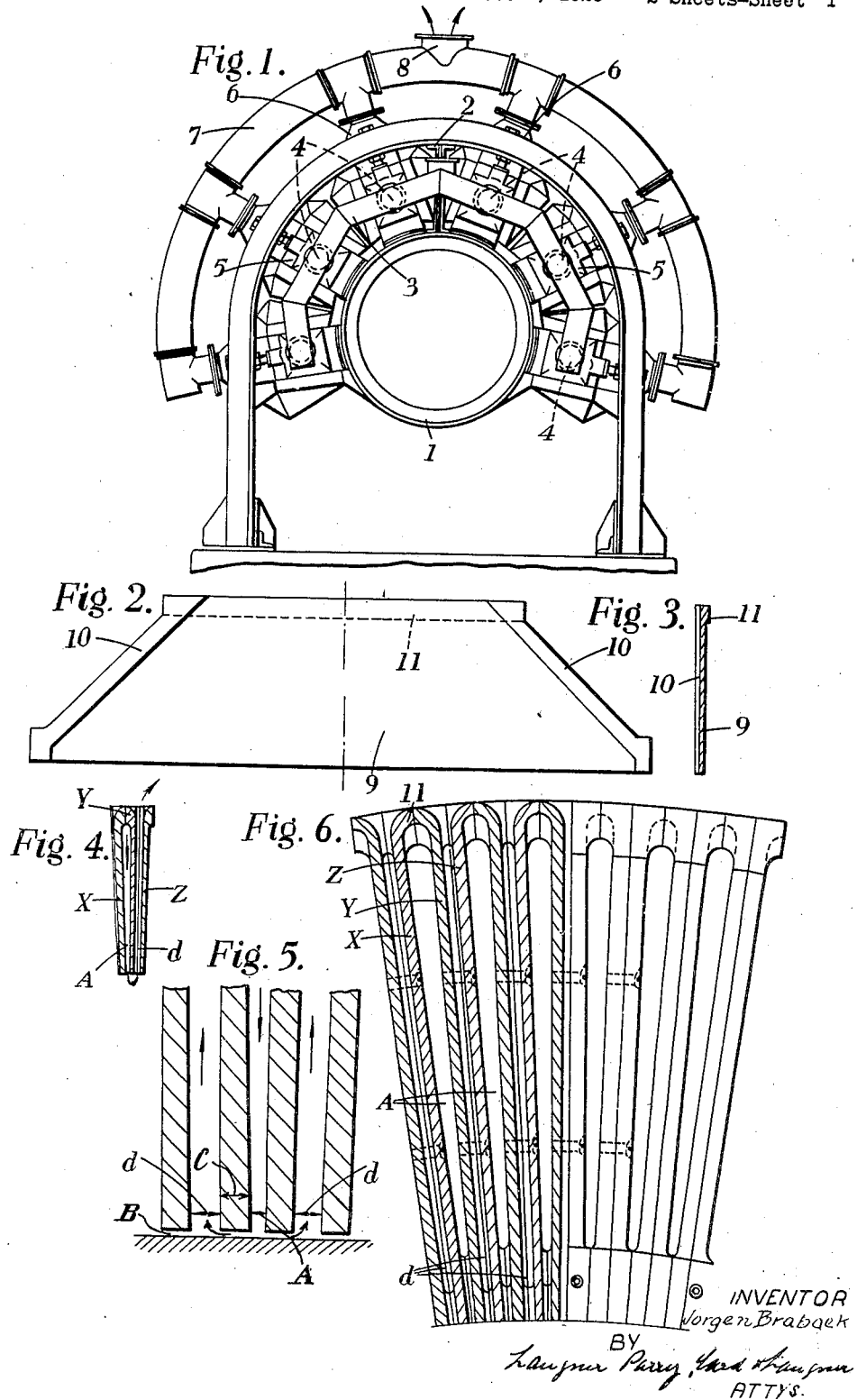

UNITED STATES PATENT OFFICE 1,933,960

APPARATUS FOR THE REMOVAL OF VAPORIZABLE CONSTITUENTS FROM LIQUID OR PASTY OR SOLID MATTERS

Jorgen Brabaek, Newton Abbott, England

Application November 2, 1929, Serial No. 404,501, and in Great Britain November 20, 1928. Renewed September 26, 1933

8 Claims. (Cl. 34—4)

This invention relates to the removal, wholly or in part, of vaporizable constituents from liquid or pasty or solid masses and has particular but not exclusive reference to the removal of water or moisture from damp or fluid masses which required to be dried or brought to a solid condition by very careful treatment in order to avoid deteriorating their chemical physical or biochemical properties. Careful treatment of this kind is necessary for example in the drying of substances containing active principles such as enzymes and vitamines.

The chief object of the present invention is to provide a process of treatment and improved apparatus in which a well regulatable and high degree of abstraction of vaporizable matter especially water can be effected without deteriorating or destroying the enzymatic or vitamine activity of the material so that for example milk can be dried to obtain a preparation in which even the delicate oxidases have not been attacked, and similarly yeast can be dried without destruction of the zymase and without destroying the vitality of the yeast cells.

A further object is to provide improved means for regulating and maintaining any desired thickness of layer of material when spreading the latter in order to expose it to heat. Accuracy of layer thickness is particularly desirable in the case of drying or evaporating apparatus such for example as that employed for the production of milk powder by pouring the liquid milk over one of a pair of spaced rotary drums or rollers and subjecting it to heat such for instance as that of a current of hot air; in such apparatus it is necessary to prevent the drying milk from accumulating as a deep layer as excessive depth retards evaporation and causes the milk to be carried round to a scraping-off blade or its equivalent before it is completely dried. Moreover any unevenness of the layer of material involves corresponding irregularity in the temperature to which it is raised.

The apparatus I employ for the purpose in view is of the kind in which the materials to be dried are subjected in sheet form to the action of streams of air which are first directed upon the material and then conducted away therefrom carrying with them some at least of the vaporizable constituents of the material.

In order to attain the object above stated I have found that the air or other gaseous medium for extracting the vaporizable constituents from the material in thin sheet or film form should not only increase in pressure as it approaches the sheet or film of material to be dried through perpendicularly directed inlet passages and impinges thereon but that this pressure should be increased immediately after impingement and maintained while the gaseous medium is travelling over the surface of the sheet or film and that this travel at maximum pressure should extend for an appreciable distance, preferably greater than twice the depth of the gap or free space between the inlet orifices and the sheet or film, whereupon the said medium should retreat perpendicularly at a lower pressure, so that the vaporizable constituent of the material may be absorbed as vapor and conveyed along by the gaseous abstracting medium under pressure and subsequently become separated therefrom in condensed form when the pressure is reduced.

In the preferred embodiment of the invention the approach and retreat passages for the vapor absorbing medium alternate with one another and are directed radially with respect to the drum.

The preferred form of apparatus in accordance with the invention comprises a travelling support on which the material to be treated is spread and an assembly of plates presenting inlet or approach passages of gradually decreasing sectional area for the flow of the medium perpendicularly onto the material alternating with outlet or retreat passages for the flow of the vapor laden medium away from said material, the dimensions of the inlet and outlet passages and of the passages along which the medium travels horizontally over the surface of the material to be dried being substantially as herein described.

The chief requirement for efficiency of abstraction of the vaporizable constituent or constituents from the material under treatment by the absorptive and sweeping effect of a current of air or other gaseous medium is that the sectional area of the space across which the medium travels after issue from a supply nozzle or group of nozzles and before retreat through an outlet passage or passages should be less than the sectional area at any other part of its path of travel. The length of this part of the path of travel is also important relatively to the size of the mouth of the nozzle or nozzles and to the size of the outlet or outlets through which the vapor-laden air or other gaseous medium passes away from the material.

Assume for example that the gaseous medium is directed perpendicularly onto the material to be treated through a rectangular nozzle of orifice width A at a distance B from the surface of the material and then spreads laterally in both directions for a distance C across the surface of the material and then retreats perpendicularly through outlet passages each of width $d$. The conditions for greatest efficiency of abstraction and removal of the moisture or other vaporizable matter in the material are that 2B should be less than A, that A should be less than $d$, and that C should be greater than 2B. These conditions apply whether the material be made to travel past the nozzle or group of nozzles by conveyance on a travelling belt or a rotating drum or plate or otherwise.

With regard to regulating the thickness of the layer of material when spread upon a drum or similar member for exposure to heat, the desired spacing between the drum and a co-acting roller is secured by providing them at their ends or edges with intercontacting surfaces adapted when adjusted relatively to each other to change the aforesaid spacing. The construction is preferably such that a comparatively great or coarse adjustment of the actual adjustable elements results in a fine adjustment of the spacing.

The invention will now be described more fully with reference to the accompanying drawings which illustrate one practical embodiment of the essential parts of a drum drier constructed according to the invention.

Figure 1 is a side elevation of the drier,

Figure 2 is a side view, and

Figure 3 a corresponding edge view of a plate a number of which when assembled face to face and back to back constitute the walls of passages or ducts for a stream of drying air or other gas.

Figure 4 is a cross sectional view of a group of three plates not to scale but illustrating the main effect of assembly.

Figure 5 is an enlarged diagrammatic view of the preferred dimensional values of the air ducts or passages as the air approaches and recedes from the surface of the drum.

Figure 6 is a part sectional and part elevational view of a group of the plates as actually made and assembled.

Figure 7 is a sectional end elevation of a drying drum having a roller mounted adjacent thereto and means for regulating the spacing according to the present invention;

Figure 8 is a longitudinal sectional elevation of the same;

Figures 9 and 10 are longitudinal sections of two modified forms of the roller.

The drier shown comprises a rotary drum 1 on which the material to be dried is spread in a uniform layer of any desired thickness and from which it is eventually scraped or otherwise removed. Surrounding about two-thirds of the drum surface is the arrangement for conveying air or other gaseous medium towards and away from the drum surface. The air is supplied under pressure to each side of the drier through an inlet pipe 2 into a distributor pipe 3 and thence through junction pipes 4 to suitable hoppers 5 located over the ends of groups of plates hereinafter described. The air enters laterally between the plates and radially inwards towards the drum and then passes over the material on the drum and retreats radially outwards through other passages between said plates into a central set of peripheral hoppers 6 leading to a collecting pipe 7 and thence through a delivery pipe 8.

The ducts or passages for the air or other gaseous drying medium are constituted by an assembly of plates 9 each of which is provided with lateral ribs 10, 10 at the lateral edges of their front face, and a rib or curved portion 11 at the top edge on the opposite face or back. These plates are assembled face to face as to one pair, and back to back as to each plate of that pair and the next plate. Thus considering the three plates X Y Z of Figure 4 it is seen that the two plates X and Y form a slightly tapering passage or nozzle A between them, this space being open at the lateral edges of the plates and at the small or inner edges, but closed at the outer edges where the curved portions 11 abut against one another. The two plates Y and Z form a passage $d$ of uniform size, this space being open at the inner and outer edges of the plates but closed at the lateral edges where the ribs 10, 10 abut.

In addition to the ribs 10, 10 and the ribs or curved portions 11, the plates may in actual manufacture be provided with suitable spacing projections at intervals to preserve the proper spacing when the plates are bolted together.

It will be understood that the lateral inlet hoppers 5 are located over the lateral edges of groups of the plates so as to feed the dry air or other gaseous medium into the passages or nozzles A from both sides of the apparatus and that the central peripheral discharge hoppers 6 are located over the outer edges of the groups of plates so as to collect and convey away the vapour laden air or other gaseous medium issuing radially outwards along the passages $d$.

In order to secure the best results certain dimensions should be observed as will now be stated with reference to Figure 5. Each outlet passage is of width $d$ and the width of each inlet or nozzle is A. Assume that the drum surface is at a distance B from the inner edges of the assembly of plates and that the thickness of each plate is C then the conditions for greatest efficiency of abstraction and removal of the moisture or other vaporizable matter in the material are that 2B should be less than A, that A should be less than $d$, and that C should be greater than 2B.

If desired the compressed air or other gaseous abstracting medium may be preheated or it may be pretreated to dry it as, for example, by preliminary refrigeration, so that in either case its capacity to absorb vapour is increased.

For many purposes air is suitable as the gaseous abstracting medium, but other gas or gases may be employed such, for example, as $CO_2$ or nitrogen where the oxygen of the air would be detrimental.

If the gaseous medium be employed in a heated condition any remaining heat in the medium as it retreats may be extracted usefully on the counter-current principle. Also after extraction of the water or other vapour from the retreating gaseous medium the latter may be used again, this being particularly desirable if gases other than air be used. Any losses of gaseous medium in the cycle may, of course, be compensated for by additional medium. This cold fresh medium may be used in the counter-current system above-mentioned; incidentally this cold air will somewhat cool the main supply of heated air and thereby cause removal of any moisture therein.

The current of air or other gaseous medium may be maintained by means of a suction fan or by a pressure pump, but is preferably used under pressure maintaining a rapid current of the gaseous medium used. The pressure is preferably built up to a maximum just before impingement on the material to be treated by forcing it through nozzles of tapered formation as already described.

The admission of the gaseous medium and its conduction away from the passages between the plates is conveniently effected sectionally as shown, so that any group of plates can be removed for inspection, cleaning or repair without disturbing the remainder. Alternatively, the gaseous medium may be supplied to the entire set of passages or separate supplies may be provided for the several sections or groups of plates, in which latter case when using a preheating medium the temperature may differ for the different groups of nozzles; for example, the warm air first encountered may advantageously be higher in temperature than that encountered later.

In cases where the vapour-laden gaseous medium retreats in an upward direction, gutters or channels fitted with gas traps may be provided to collect the condensation products and divert them so that they do not fall back onto the devaporized material. As the vapour-laden air or other gaseous medium retreats it expands and its vapour content becomes separated out by condensation.

Reference will now be made to Figures 7 to 10 illustrating means for regulating the thickness of the material when spread on the surface of the drum.

12 is a roller mounted adjacent the drum 1 and spaced therefrom at a distance $x$ by means of the tapered or conical collars 13 screwed one at each end onto the roller 12 so as to have rolling contact with the periphery of the drum 1 at its ends. It will be understood that by screwing the collars 13 along the roller 12 the extent of the space $x$ can be accurately adjusted and that a relatively coarse adjustment of the collars 13 will effect a fine adjustment of the space $x$.

In the construction shown in Figure 8 the roller 12 is provided externally with a gear wheel 14 and is provided internally at its ends with ferrules 15 to serve as end bearings on a central rod or axle 16. The axle 16 is hollow at each end and is perforated as at 17 so that a cooling fluid can be passed along the intervening space 18 between the rod and the roller to protect the latter and hence the spacing $x$ against the effects of temperature changes.

In the construction shown in Figure 9 the tendency or liability of temperature changes to warp the roller 12 or otherwise cause undesired variations in the spacing $x$ is counteracted by making the end portions of the roller 12 internally free from the axle 16 and by keying said roller to said axle at the mid portion only as shown at 19. Also in order to quickly arrive at any one or other of a number of predetermined spacings, a selected number of spacing washers 20 may be fitted between the ends of the roller 12 and the end collars 13.

In Figures 8 and 9 the conical surfaces have been shown as formed upon the collars 13 on the roller 12 but it will be understood that such surfaces may be upon the ends of the drum 1 as shown at 21 on Figure 10 in which case the collars 13 may be plain discs.

Although the invention has been illustrated as applied to drums only, it is to be understood that the larger or drying drum may be replaced by a travelling belt or reciprocating plate, the surface of which is in effect the surface of a drum of infinite radius.

What I claim is:—

1. Apparatus for removing vaporizable constituents from liquid or pasty or solid matter in film or layer form, comprising a rotary drum on which said matter is carried and a partially encircling assembly of plates presenting radially-directed converging compressed air supply passages having their orifices near the drum surface and retreat passages alternating between the supply passages.

2. Apparatus as claimed in claim 1, each supply orifice being of width A located at a distance B from the material on the drum, the retreat orifices adjacent each supply orifice being each of width $d$ and the lateral travel of the air between issue and retreat being C, also 2B being less than A, also A less than $d$, and C greater than 2B.

3. In apparatus comprising a travelling support for conveying material in film or layer form past impinging streams of vapour-absorbing medium, an assembly of plates shaped to present a series of medium supply passages each of sectional area gradually decreasing up to its exit orifice adjacent said material and a series of intervening exit passages each of uniform sectional area.

4. In apparatus comprising a travelling support for conveying material in film or layer form past impinging streams of vapour-absorbing medium, an assembly of plates shaped to present a series of medium supply passages each of narrow rectangular cross section gradually diminishing up to its exit adjacent said material and open at its lateral edges, and a series of exit passages of uniform rectangular section each closed at its lateral edges and open at the end adjacent the material and also at the end remote therefrom.

5. In apparatus comprising a travelling support for conveying material in film or layer form past impinging streams of vapour-absorbing medium, an assembly of plates shaped to present a series of medium supply passages each plate having a lateral rib at each lateral edge of its front face and a rib at the outer edge on the opposite face.

6. In apparatus comprising a travelling support for conveying material in film or layer form past impinging streams of vapour-absorbing medium, an assembly of plates shaped to present a series of medium supply passages each plate having a lateral rib at each lateral edge of its front face and a rib at the outer edge on the opposite face, the plates being assembled face to face as to one pair and back to back as to one plate of that pair and the next adjacent plate.

7. Apparatus for removing vaporizable constituents from liquid or pasty or solid matter in film or layer form, comprising a rotary drum supporting said matter, means consisting of a plurality of tapering passages each of orifice width A located at a distance B from the surface of said matter for directing and uniformly increasing the pressure of a stream of vapor absorbing medium impinging perpendicularly onto said matter, means whereby the medium is constrained to move laterally over said matter and means conveying the medium away from said matter consisting of a plurality of passages of uniform width alternating with the inlet passages and each of width $d$, also 2B being less than A, and A less than $d$.

8. Apparatus as claimed in claim 7, the distance traversed by the medium laterally being C and the depth of the laterally conducting passage being B, and C being greater than 2B.

JORGEN BRABAEK.